United States Patent
Yamada et al.

(10) Patent No.: US 8,590,924 B2
(45) Date of Patent: Nov. 26, 2013

(54) AIRBAG SYSTEM OF SADDLE-RIDE TYPE VEHICLE

(75) Inventors: Yasuto Yamada, Wako (JP); Satoshi Iijima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 12/877,201

(22) Filed: Sep. 8, 2010

(65) Prior Publication Data

US 2011/0074137 A1 Mar. 31, 2011

(30) Foreign Application Priority Data

Sep. 30, 2009 (JP) .................................. 2009-226623

(51) Int. Cl.
*B60R 21/2338* (2011.01)

(52) U.S. Cl.
USPC .......................... 280/729; 280/743.2; 180/219

(58) Field of Classification Search
CPC .................................................... B60R 21/233
USPC ........ 280/729, 742, 743.2, 741, 740; 180/219
See application file for complete search history.

(56) References Cited

U.S. PATENT DOCUMENTS

| | | | | |
|---|---|---|---|---|
| 3,802,719 | A * | 4/1974 | Brown | 280/729 |
| 6,209,908 | B1 * | 4/2001 | Zumpano | 280/729 |
| 6,616,177 | B2 * | 9/2003 | Thomas et al. | 280/729 |
| 6,702,321 | B2 * | 3/2004 | Thoma | 280/730.1 |
| 6,709,009 | B1 * | 3/2004 | Michael et al. | 280/729 |
| 6,932,379 | B2 * | 8/2005 | Yamazaki et al. | 280/730.1 |
| 6,971,666 | B2 * | 12/2005 | Akiyama et al. | 280/729 |
| 7,044,499 | B2 * | 5/2006 | Miyata et al. | 280/730.1 |
| 7,347,445 | B2 * | 3/2008 | Choi | 280/729 |
| 7,396,043 | B2 * | 7/2008 | Choi et al. | 280/743.1 |
| 7,695,002 | B2 * | 4/2010 | Choi | 280/729 |
| 7,744,116 | B2 * | 6/2010 | Kato et al. | 280/730.1 |
| 7,900,961 | B2 * | 3/2011 | Hanawa et al. | 280/743.1 |
| 7,934,744 | B2 * | 5/2011 | Suzuki et al. | 280/728.2 |
| 2001/0042973 | A1 * | 11/2001 | Thoma | 280/728.1 |
| 2002/0113416 | A1 * | 8/2002 | Uchida | 280/729 |
| 2002/0185845 | A1 * | 12/2002 | Thomas et al. | 280/729 |
| 2003/0094794 | A1 * | 5/2003 | Amamori | 280/729 |
| 2003/0189323 | A1 * | 10/2003 | Akiyama et al. | 280/729 |
| 2004/0046369 | A1 * | 3/2004 | Michael et al. | 280/729 |
| 2006/0131092 | A1 * | 6/2006 | Tsujii et al. | 180/219 |
| 2006/0284400 | A1 * | 12/2006 | Sakakibara et al. | 280/728.2 |
| 2007/0290488 | A1 * | 12/2007 | Taguchi et al. | 280/730.2 |
| 2008/0054602 | A1 * | 3/2008 | Yang | 280/729 |

(Continued)

FOREIGN PATENT DOCUMENTS

| | | |
|---|---|---|
| DE | 10317927 A1 | 11/2003 |
| DE | 10216900 A1 | 3/2004 |

(Continued)

OTHER PUBLICATIONS

Saito, JP 2002-137780 Machine translation.*

(Continued)

*Primary Examiner* — Karen Beck
(74) *Attorney, Agent, or Firm* — Squire Sanders (US) LLP

(57) ABSTRACT

An airbag system of a saddle-ride type vehicle can include an airbag which is configured to be inflated and deployed in front of a rider. The airbag includes a plurality of expansion chambers, with the expansion chambers configured to be different in internal pressure during inflation and deployment.

14 Claims, 18 Drawing Sheets

(56) References Cited

U.S. PATENT DOCUMENTS

| | | | |
|---|---|---|---|
| 2010/0213692 A1* | 8/2010 | Nagai et al. | 280/729 |
| 2010/0225095 A1* | 9/2010 | Smith et al. | 280/729 |
| 2011/0018240 A1* | 1/2011 | Marable et al. | 280/728.3 |
| 2011/0074137 A1* | 3/2011 | Yamada et al. | 280/729 |
| 2012/0049491 A1* | 3/2012 | Yoo | 280/729 |

FOREIGN PATENT DOCUMENTS

| | | |
|---|---|---|
| JP | 2002-137780 | 5/2002 |
| JP | 2005075143 A | 3/2005 |
| JP | 2007-069785 | 3/2007 |

OTHER PUBLICATIONS

Rauscher et al. DE 102 16900 Machine Translation, 12 pages.*

European Search Report dated Dec. 17, 2010 in corresponding European Patent Application No. EP2305542A1, 1 page.

* cited by examiner

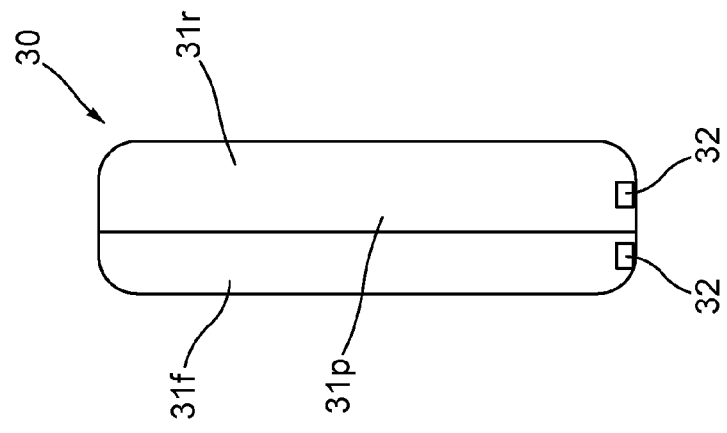
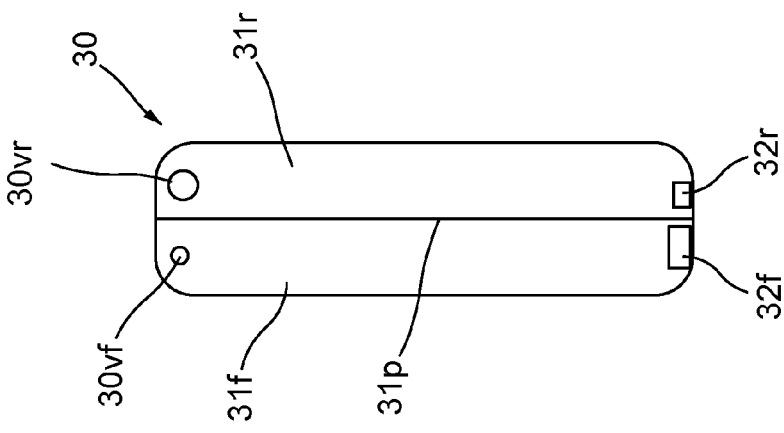
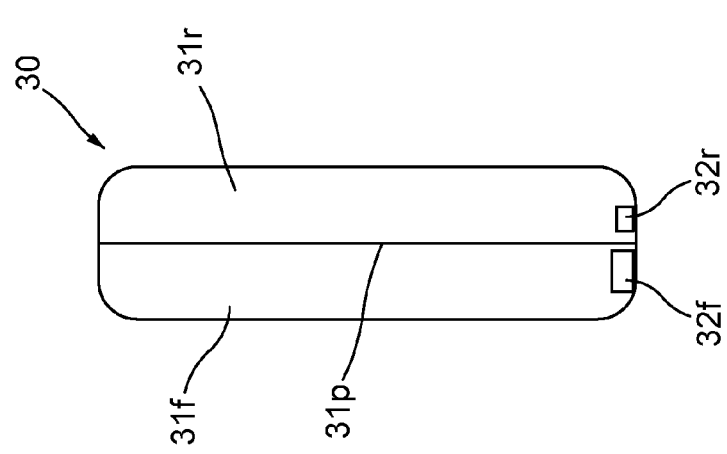

Fig. 8
(a)
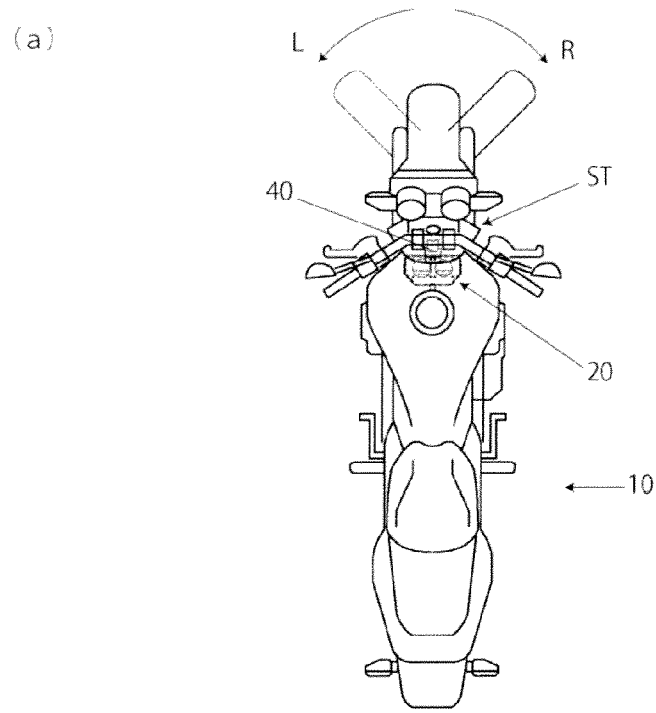
(b)
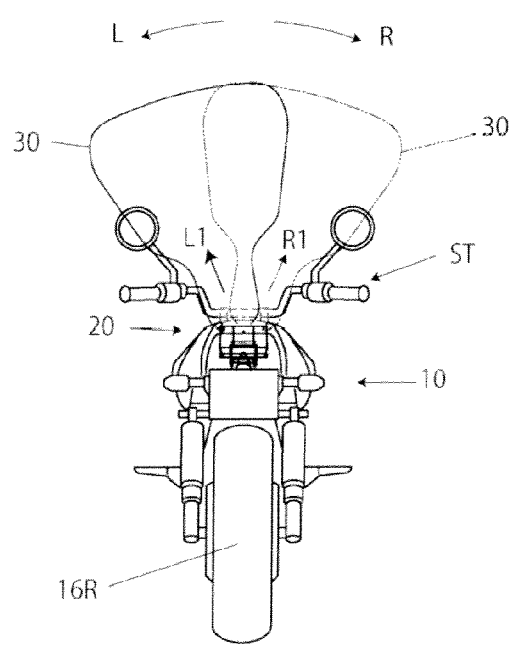

Fig. 14
(a)
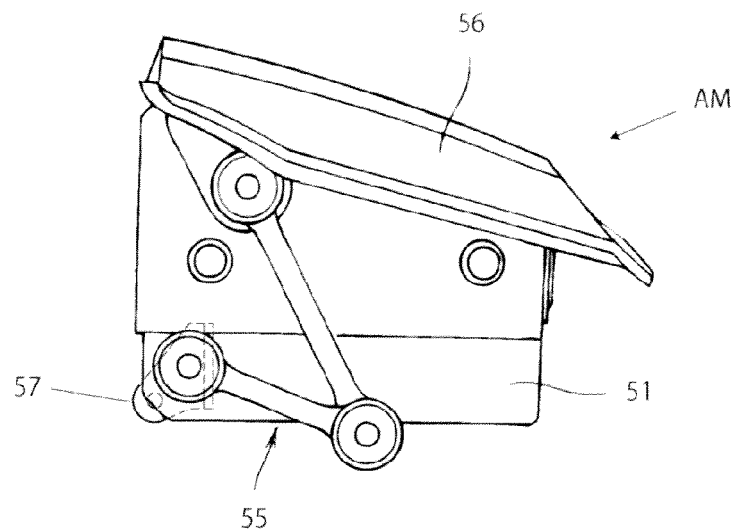
(b)
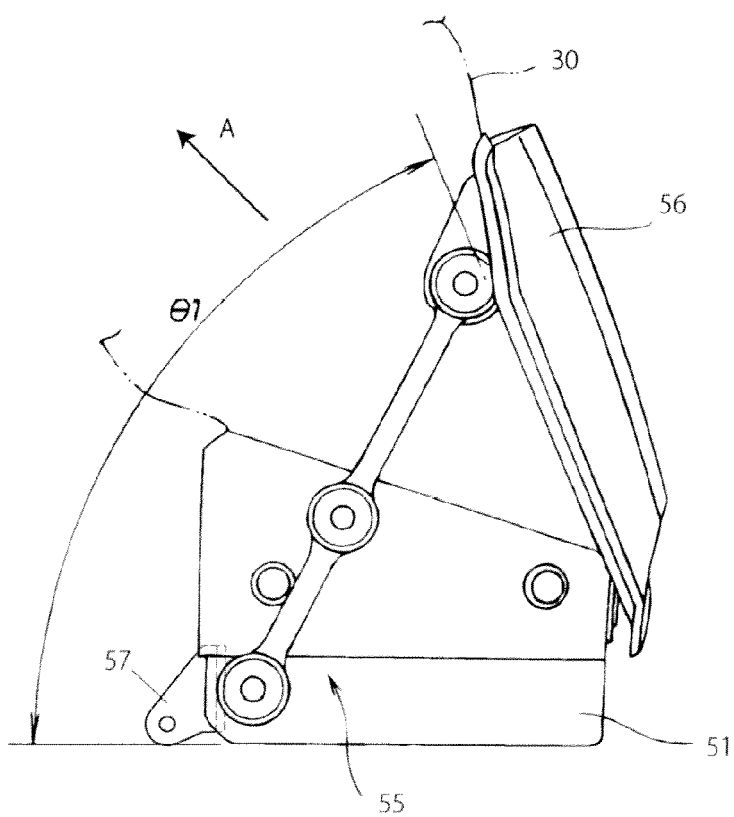

Fig. 16
(a)
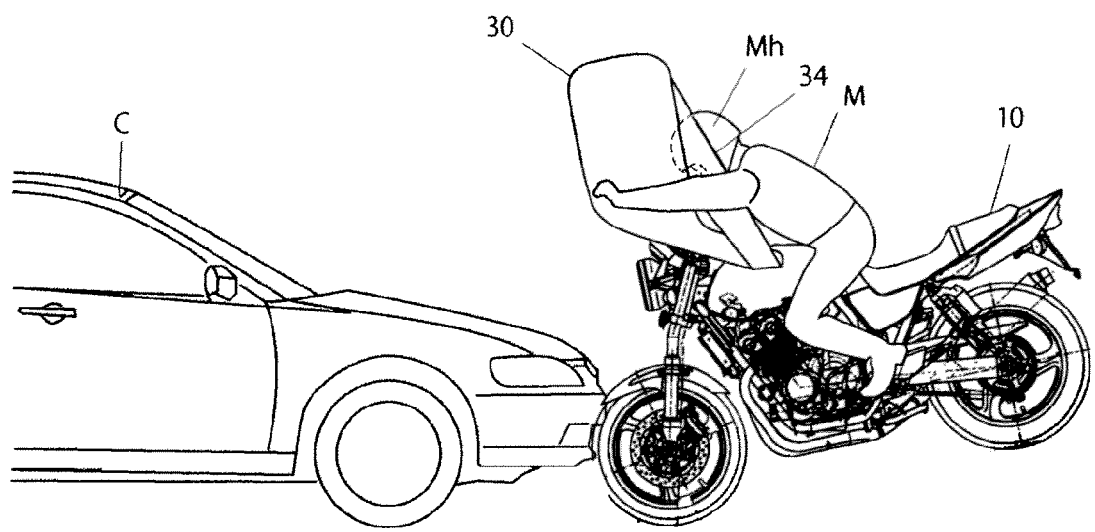
(b)
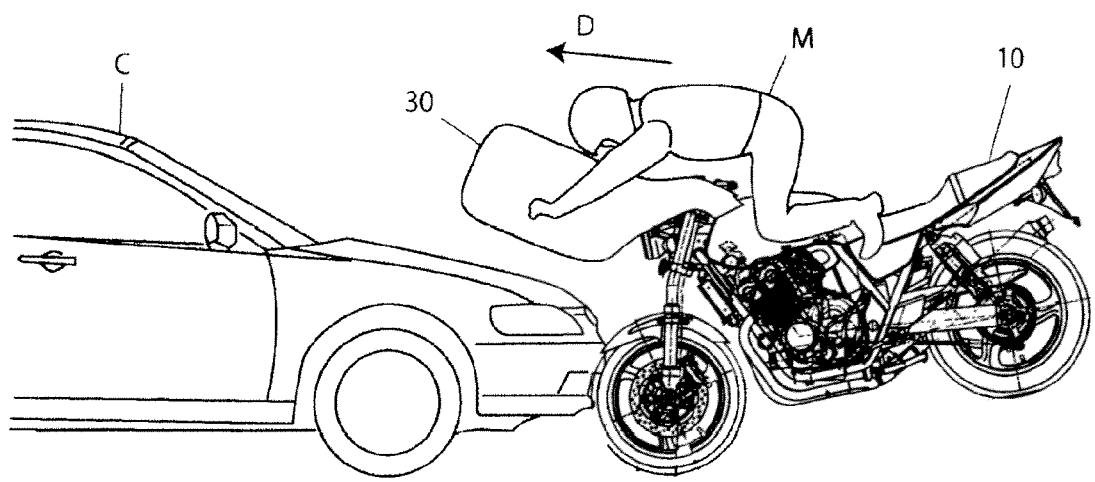

Fig. 18
(a)
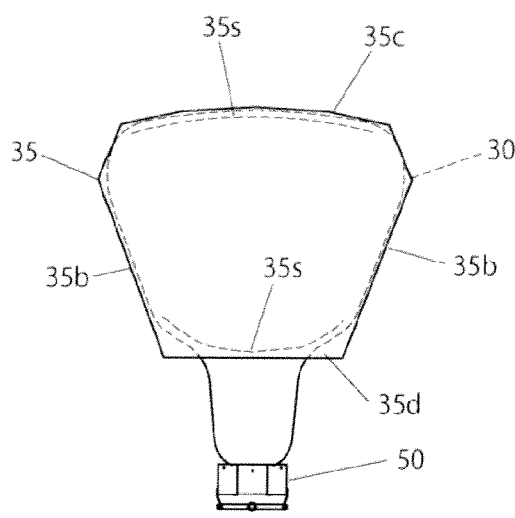
(b)
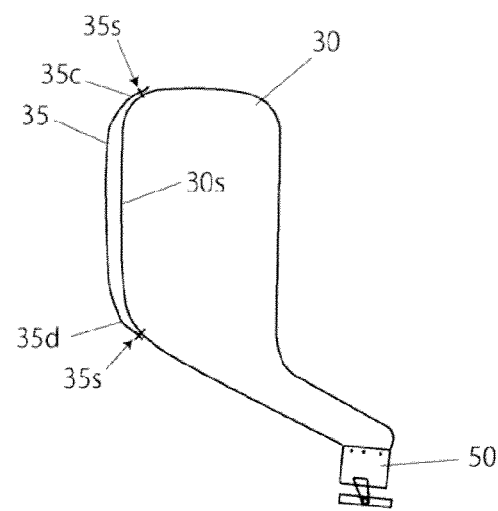
(c)
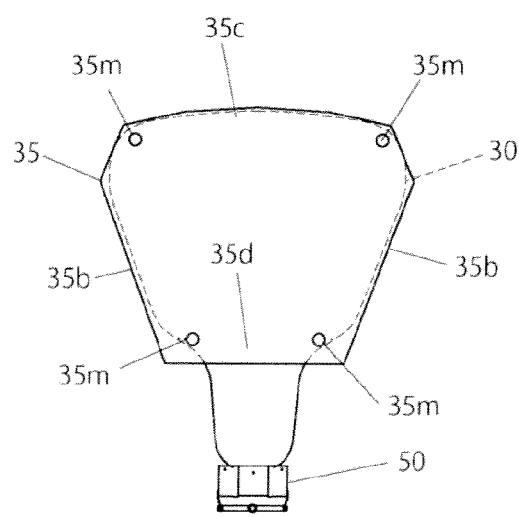
(d)
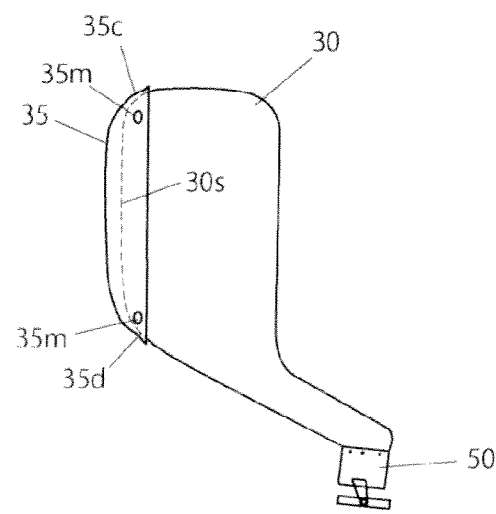

AIRBAG SYSTEM OF SADDLE-RIDE TYPE VEHICLE

BACKGROUND

1. Field

This invention relates to an airbag system of a saddle-ride type vehicle.

2. Description of Related Art

An airbag system provided with an airbag inflated and deployed between a wind screen of a vehicle and a rider, as disclosed in a patent literature 1 (JP-A No. 2007-069785), for example of the saddle-ride type vehicle such as a motorcycle, is known.

As disclosed for example in patent literature 2 (JP-A No. 2002-137780), an airbag system provided with plural expansion chambers is also known. The airbag system of this saddle-ride type vehicle is intended to inflate and deploy an airbag laterally uniformly and in short time. The airbag is provided with mutually separated plural expansion chambers, and each expansion chamber is provided with an inflator.

An airbag is inflated and deployed between an object of collision and a rider and acts as a buffer between the object of collision and the rider so as to protect the rider. Accordingly, hardness and softness enough to act as the buffer between the object of collision and the rider are required for the airbag. However, the airbag disclosed in the patent literature 1 is provided with only single internal space and though the airbag disclosed in the patent literature 2 is provided with the plural expansion chambers, the expansion chambers are merely inflated and deployed laterally uniformly.

SUMMARY

Accordingly, an object of the present invention is to provide an airbag system provided with both hardness and softness enough to act as a buffer between an object of collision and an rider of a saddle-ride type vehicle.

To achieve the object, an embodiment of the airbag system of the saddle-ride type vehicle according to the present invention is based upon an airbag system of including an airbag which is configured to be inflated and deployed in front of a rider and has a characteristic that the inside of the airbag is divided into plural expansion chambers, different in internal pressure, during inflation and deployment in a longitudinal direction of the vehicle.

According to the airbag system of the saddle-ride type vehicle, as the inside of the airbag is divided into the plural expansion chambers in the longitudinal direction of the vehicle. The internal pressure in inflating and deploying of the expansion chambers is different. The expansion chamber having a higher internal pressure can be made to function as an expansion chamber provided with enough hardness to act as a buffer between an object of collision and an rider, and at the same time, the expansion chamber having lower internal pressure can be made to function as an expansion chamber provided with enough softness to also act as a buffer between the object of collision and the rider.

That is, according to embodiments of the present invention, an airbag system can be provided with both hardness and softness enough to act as a buffer between the object of collision and the rider.

It is desirable that as for the internal pressure of the plural expansion chambers, the internal pressure of the rearmost expansion chamber is reduced, compared with the internal pressure of the front expansion chamber.

As a result, the front expansion chamber contacting the object of collision can be configured as an expansion chamber provided with hardness and contour holding capability suitable for contacting to the object of collision by relatively hardening the front expansion chamber, compared with the rearmost expansion chamber touched to the rider, and at the same time, the rearmost expansion chamber contacting the rider can be configured as an expansion chamber provided with softness suitable for being contacted by the rider by relatively softening the rearmost expansion chamber, compared with the front expansion chamber touched to the object of collision.

It is desirable that each inflator, different in output, is provided to the plural expansion chambers and the plural expansion chambers are inflated and deployed by the respective inflators.

As a result, the internal pressure of the expansion chambers can be differentiated with a simple configuration that the inflators different in output are provided to the plural expansion chambers.

It is desirable that vent holes different in the area of an opening are provided to the plural expansion chambers so as to differentiate each internal pressure in inflating and deploying.

As a result, the internal pressure of the expansion chambers can be differentiated with simple configuration that the vent holes different in the area of the opening are provided to the plural expansion chambers.

It is desirable that the volume of the plural expansion chambers is differentiated and the inflator having the same output is provided to each expansion chamber.

As a result, the internal pressure of the expansion chambers can be differentiated without preparing inflators having different output.

BRIEF DESCRIPTION OF DRAWINGS

FIGS. 6(a) to 6(c) are explanatory drawings showing means for differentiating the internal pressure of plural expansion chambers 31f, 31r.

FIGS. 8(a) and 8(b) are explanatory drawings for explaining the operation of an interlocking device for interlocking the steering unit ST and the airbag 30, FIG. 8(a) is a plan, and FIG. 8(b) shows the vehicle shown in FIG. 8(a) viewed from the back.

FIG. 11(a) is a plan, FIG. 11(b) is a side view of FIG. 11(a), and FIG. 11(c) is a front view of FIG. 11(a) (view viewed from the back of the vehicle).

FIG. 14(a) is a side view showing the airbag module and FIG. 14(b) is a side view showing a state in which a lid is open.

FIG. 15(a) is a side view, and FIG. 15(b) shows the vehicle viewed from the back.

FIG. 16(a) is an explanatory drawing for explaining action and FIG. 16(b) shows a comparative embodiment.

FIG. 18(a) is a front view showing an embodiment in which a protective sheet 35 is installed, FIG. 18(b) is a side sectional view of FIG. 18(a), FIG. 18(c) is a front view showing another installation method of the protective sheet 35, and FIG. 18(d) is a side view of FIG. 18(c).

DETAILED DESCRIPTION

Referring to drawings, embodiments of an airbag system of a saddle-ride type vehicle according to this invention will be described below.

Figure 1:
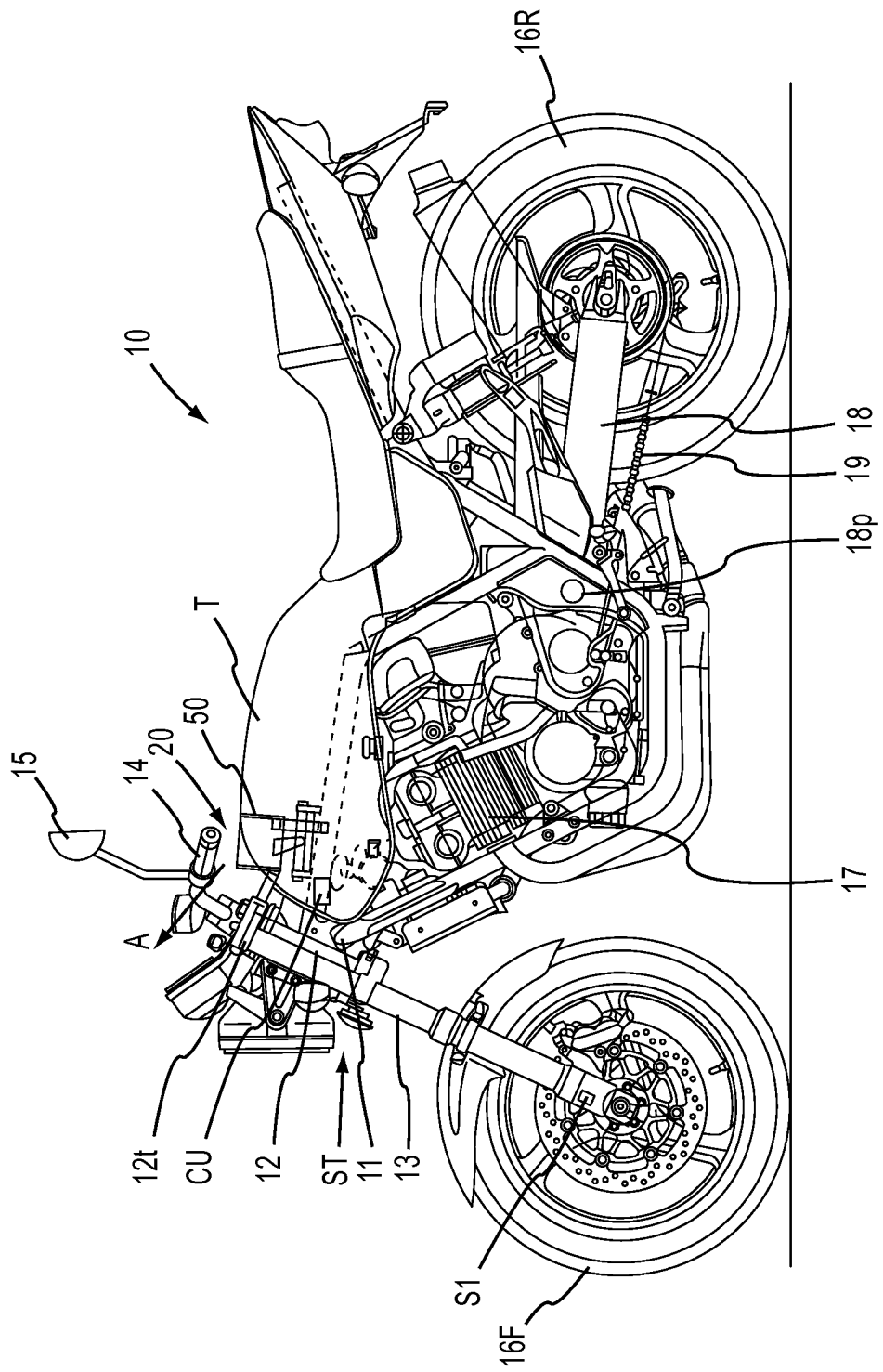
FIG. 1 is a partially perspective side view showing one embodiment of a saddle-ride type vehicle using one embodiment of an airbag system of the saddle-ride type vehicle according to the present invention.
Figure 2:
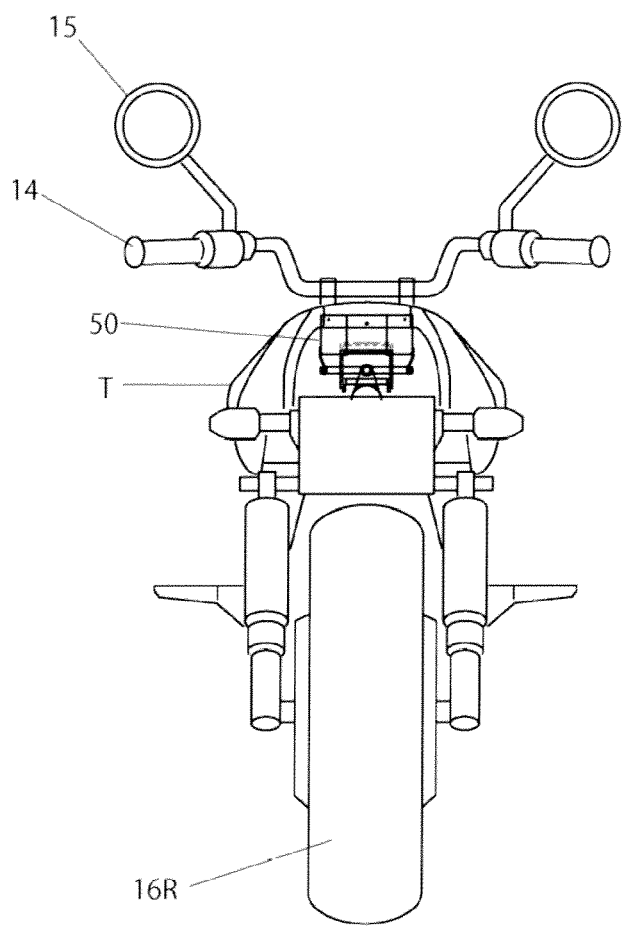
FIG. 2 is a partially perspective schematic diagram showing the vehicle viewed from the back.

FIG. 1 is a side view showing one embodiment of a saddle-ride type vehicle using one embodiment of the airbag system of the saddle-ride type vehicle according to the present invention and FIG. 2 shows the vehicle viewed from the back.

The example of vehicle 10 shown in FIGS. 1 and 2 is a motorcycle, though other vehicles can be used in this or other embodiments of the invention. This motorcycle 10 is provided with a frame 11 configuring its body. A pair of right and left front forks 13 is steerably attached to a head pipe 12 configuring a front end of the body frame 11, and a handlebar 14 is attached to each upside of the front forks 13. A back or rearview mirror 15 can be attached to the handlebar 14. A front wheel 16F is rotatably attached to a lower end of the front fork 13, and an engine 17 is fixed to the body frame 11. A swing arm 18 is vertically swingably attached to the rear of the body frame 11 via a pivot 18p and a rear wheel 16R which is a driving wheel is rotatably attached to a rear end of the swing arm 18. The rear wheel 16R is driven via a chain 19 or other torque transmitting device, such as a drive shaft or a belt, provided between the rear wheel and the engine 17.

Figure 3:
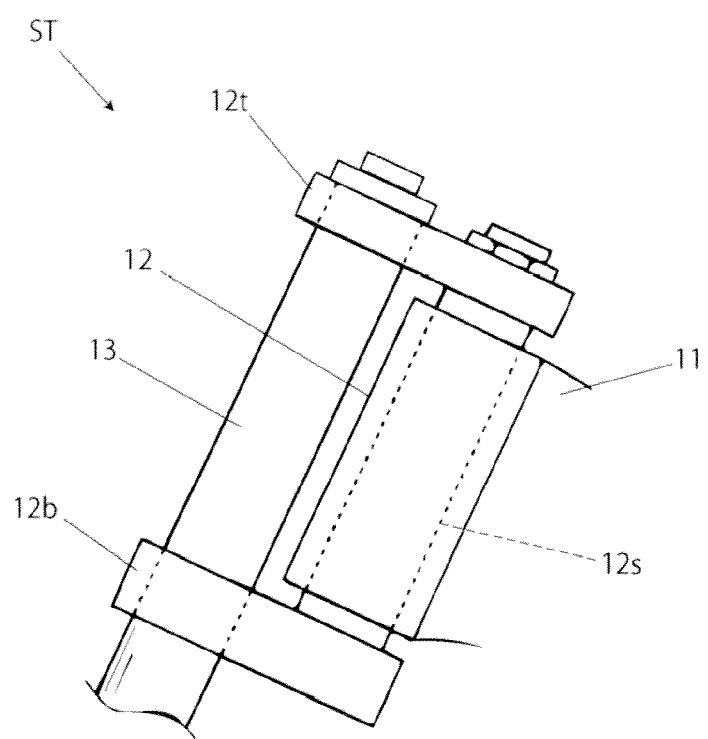
FIG. 3 is a side view showing a steering unit.

A steering unit ST in the motorcycle 10 can be configured using well-known basic structure. The steering unit ST can be configured by turnably supporting a stem shaft 12s by the head pipe 12 as shown, for example in FIG. 3, connecting a top bridge 12t and a bottom bridge 12b to an upper part and a lower part of the stem shaft 12s, supporting the pair of front forks 13 with the top bridge 12t and the bottom bridge 12b, rotatably attaching the front wheel 16F to the lower ends of the front forks 13 and fixing the handlebar 14 (see FIG. 1) to the top bridge 12t.

The above-mentioned steering unit ST can change a course of the motorcycle 10 clockwise or counterclockwise in a top view when an rider turns the handlebar 14.

Figure 4:
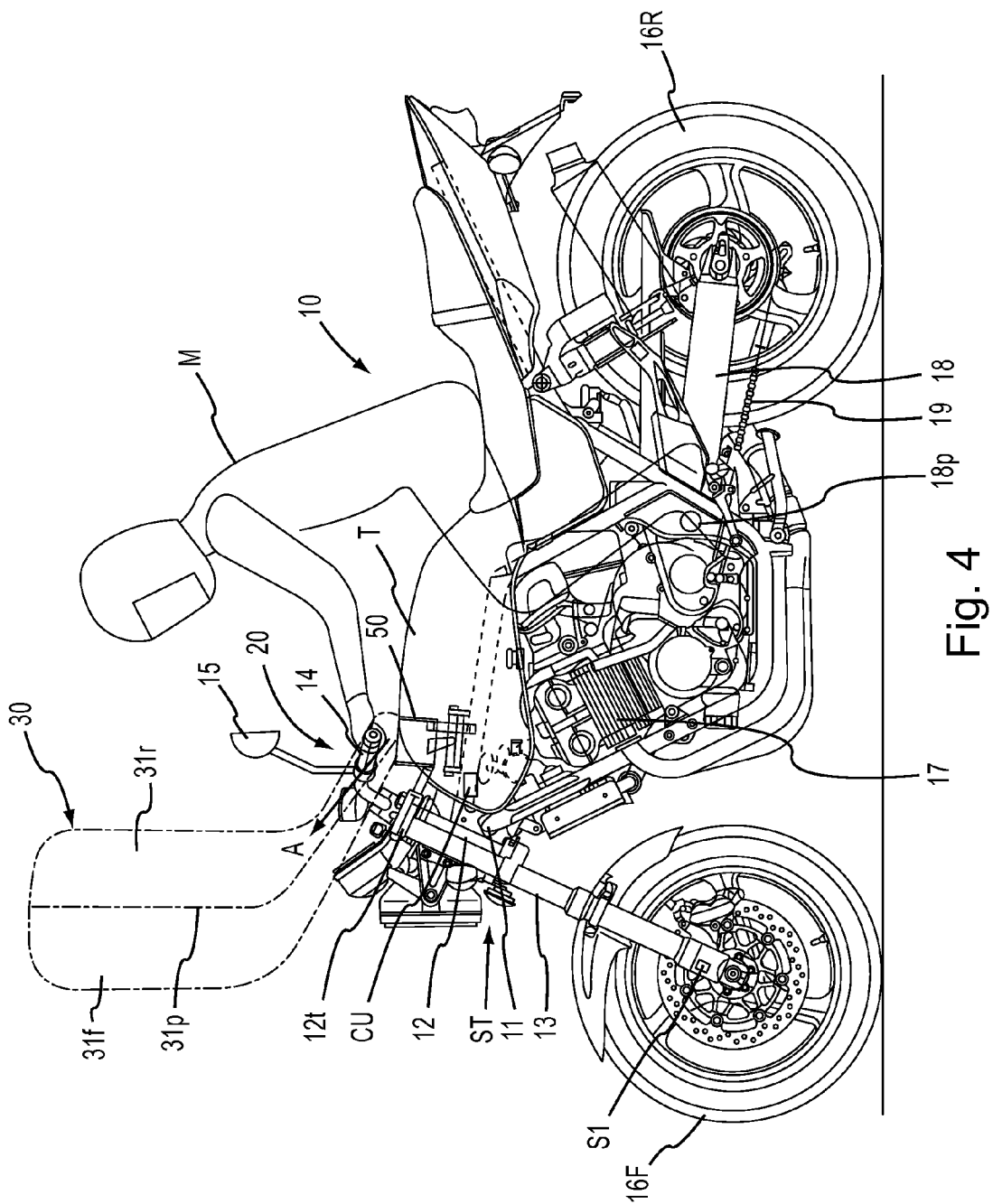
FIG. 4 is a partially perspective side view showing a state of the motorcycle an airbag of which is inflated and deployed.
Figure 5:
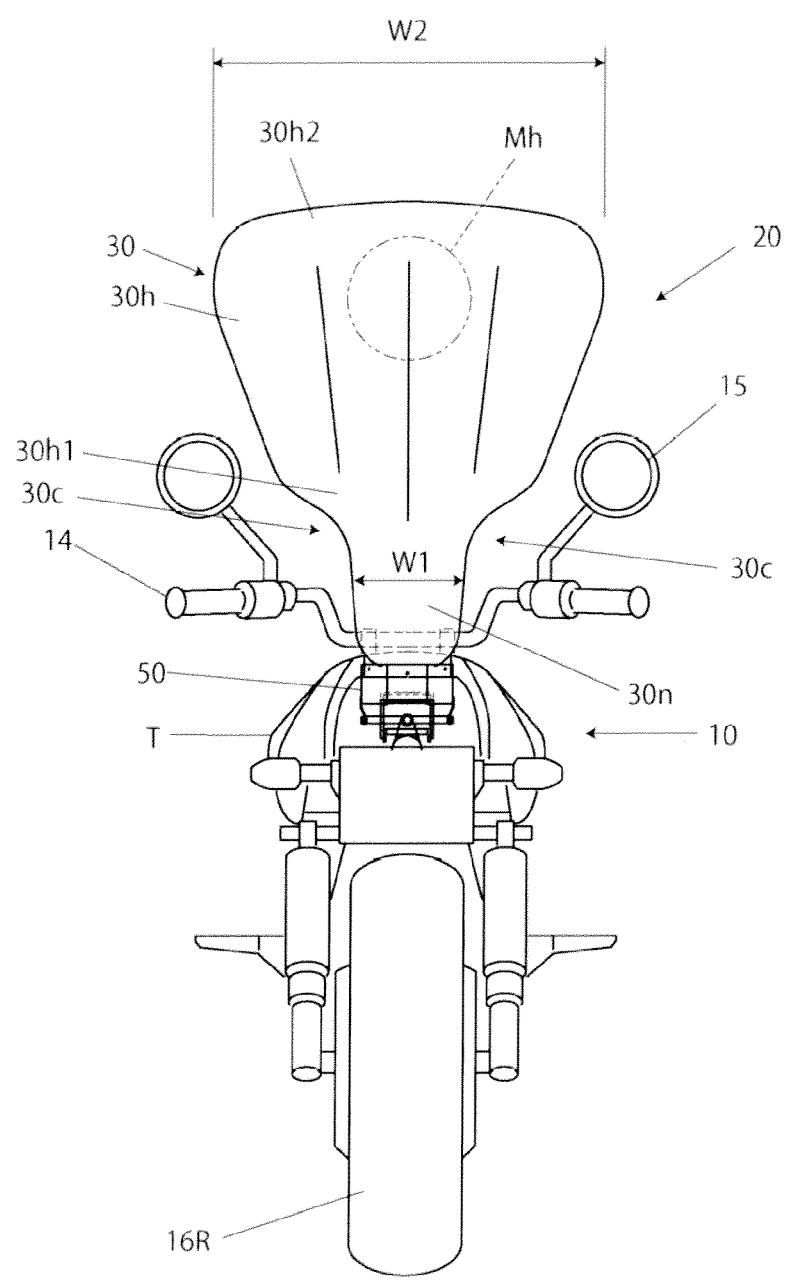
FIG. 5 is a partially perspective schematic diagram showing the vehicle viewed from the back.

FIG. 4 is a side view showing a state in which an airbag is inflated and deployed of the motorcycle 10 and FIG. 5 shows the motorcycle viewed from the back.

As shown in FIGS. 4 and 5, the airbag system 20 is mounted in the front of a fuel tank T in the motorcycle 10.

The airbag system 20 is provided with the airbag 30 inflated and deployed in front of a rider M. The inside of the airbag 30 is divided into plural expansion chambers 31f, 31r different in internal pressure in inflating and deploying in a longitudinal direction of the vehicle 10. A reference sign 31p denotes a partition that partitions the inside of the airbag 30 into the front and rear expansion chambers 31f, 31r. The airbag 30, in this example, is divided in two in the longitudinal direction, however, the airbag can be also divided into three chambers or more.

Figure 7:
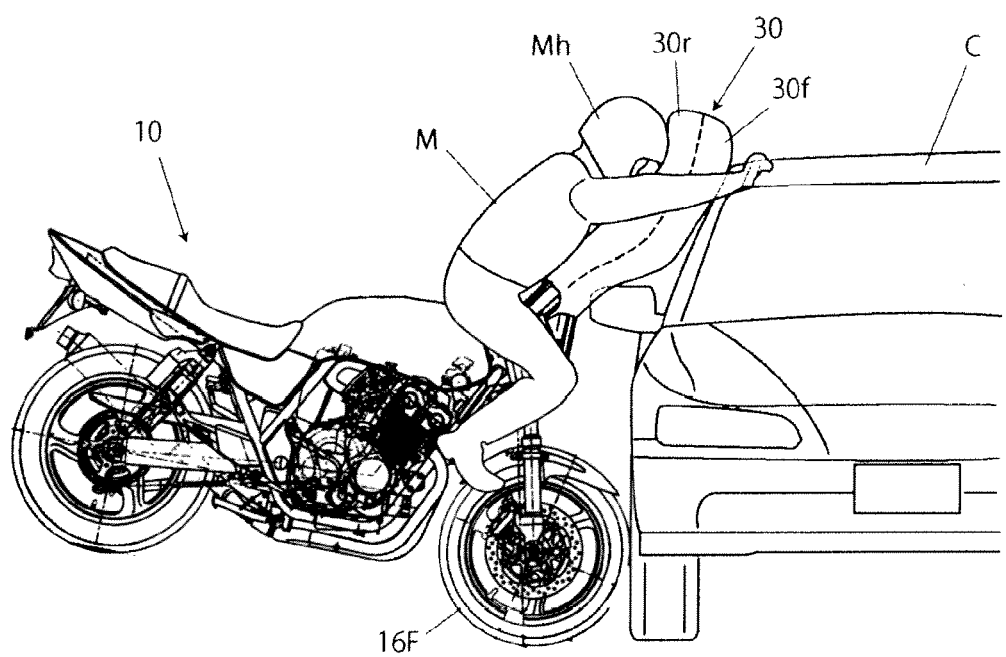
FIG. 7 is a side view showing a state of collision.

As a result, as the inside of the airbag 30 is divided into the plural expansion chambers 31f, 31r in the longitudinal direction of the vehicle 10, and the internal pressure in the inflating and deploying of the expansion chambers 31f, 31r is different, the expansion chamber (for example, 31f) having higher internal pressure can be made to function as an expansion chamber provided with enough hardness or firmness to support the airbag 30 in contact with an object of collision (for example, a vehicle of the other party C shown in FIG. 7). At the same time, the expansion chamber (for example, 31r) having lower internal pressure can be made to function as an expansion chamber provided with enough softness to acquire buffer action in contact with rider M.

According to the airbag system 20 of the saddle-ride type vehicle, sufficient hardness and softness, to act as a shock absorber between the object of collision C and the rider M, can be acquired.

As for the internal pressure of the plural expansion chambers 31f, 31r, the internal pressure of the rearmost expansion chamber 31r is reduced, compared with the internal pressure of the front expansion chamber 31f.

As a result, the front expansion chamber 31f contacts the object of collision C and can be configured as an expansion chamber provided with hardness and contour holding capability suitable for contacting the object of collision C by making the front expansion chamber relatively firm, compared with the rearmost expansion chamber 31r which is configured to contact rider M. The rearmost expansion chamber 31r, contacting the rider M, can be configured as an expansion chamber provided with softness suitable to being touched to the rider M by making the rearmost expansion chamber relatively soft, compared with the front expansion chamber 31f contacting the object of collision C.

FIGS. 6(a) to 6(c) are explanatory drawings showing means for differentiating each internal pressure of the plural expansion chambers 31f, 31r.

Each internal pressure of the plural expansion chambers 31f, 31r can be differentiated by providing inflators 32f, 32r, different in output, to the expansion chambers 31f, 31r as shown in FIG. 6(a) and inflating and deploying the plural expansion chambers 31f, 31r by the respective inflators 32f, 32r. In this case, the internal pressure of the rearmost expansion chamber 31r can be reduced, compared with the internal pressure of the front expansion chamber 31f, by reducing the output of the inflator 32r for inflating the rearmost expansion chamber 31r, compared with the output of the inflator 32f for inflating the front expansion chamber 31f.

As a result, the internal pressure of the expansion chambers 31f, 31r can be differentiated with simple configuration that the inflators 32f, 32r, having different output capability are provided to the plural expansion chambers 31f, 31r.

The internal pressure of the plural expansion chambers 31f, 31r can also be differentiated by providing vent holes 30vf, 30vr different in the area of an opening to the plural expansion chambers 31f, 31r as shown in FIG. 6(b). This can differentiate the quantity of the relief of gas from the plural expansion chambers 31f, 31r, during inflation and deployment. In this case, the internal pressure of the rearmost expansion chamber 31r can be reduced, compared with the internal pressure of the front expansion chamber 31f, by increasing the area of the opening of the vent hole 30vr provided to the rearmost expansion chamber 31r, compared with the area of the opening of the vent hole 30vf provided to the front expansion chamber 31f.

As a result, the internal pressure of the expansion chambers 31f, 31r can be differentiated with the simple configuration that the vent holes 30vf, 30vr, different in the area of the opening, are provided to the plural expansion chambers 31f, 31r. In this case, the output of the inflators that inflate the plural expansion chambers 31f, 31r may be also similar and the output of the inflator 32r that inflates the rearmost expansion chamber 31r can be also reduced, compared with the output of the inflator 32f that inflates the front expansion chamber 31f as shown in FIG. 6(b).

The internal pressure of the plural expansion chambers 31f, 31r can also be differentiated by differentiating the volume of the plural expansion chambers 31f, 31r as shown in FIG. 6(c) and providing the inflators 32 having the same output to each expansion chamber 31f, 31r. In this case, the internal pressure of the rearmost expansion chamber 31r can be reduced, compared with the internal pressure of the front expansion chamber 31f, by increasing the volume of the rearmost expansion chamber 31r, compared with the volume of the front expansion chamber 31f.

As a result, the internal pressure of the expansion chambers 31f, 31r can be differentiated without providing inflators being different in output.

As shown in FIG. 8(a), the airbag system 20 can be provided with an interlocking device 40 between the steering unit ST and the airbag 30. An example of the concrete configuration of the interlocking device 40 will be described later, however, the interlocking device 40 is a device for determining a direction of the inflating and deploying of the airbag 30 according to a state of the steering unit ST during a collision with the vehicle of the other party C (more precisely, immediately after collision), that is, in the inflating and deploying of the airbag 30.

The interlocking device 40 directs the airbag 30 counterclockwise L as shown by a full line in FIG. 8(b) in a view from the back of the vehicle 10, and inflates and deploys the airbag (the direction of inflating and deploying is shown by an arrow L1) when the steering unit ST directs the vehicle 10 clockwise in a top view. That is, the steering unit ST is turned clockwise R as shown by a full line in FIG. 8(a) during inflation and deployment of the airbag 30. The interlocking device directs the airbag 30 clockwise R as shown by an imaginary line in FIG. 8(b) in the view from the back of the vehicle, and inflates and deploys the airbag (the direction of inflating and deploying is shown by an arrow R1) when the steering unit ST directs the vehicle 10 counterclockwise L, as shown by an imaginary line in FIG. 8(a) in the top view. That is, the steering unit ST is turned counterclockwise L during inflation and deployment of the airbag 30.

As a result, the following action and effect are acquired.

Figure 9:
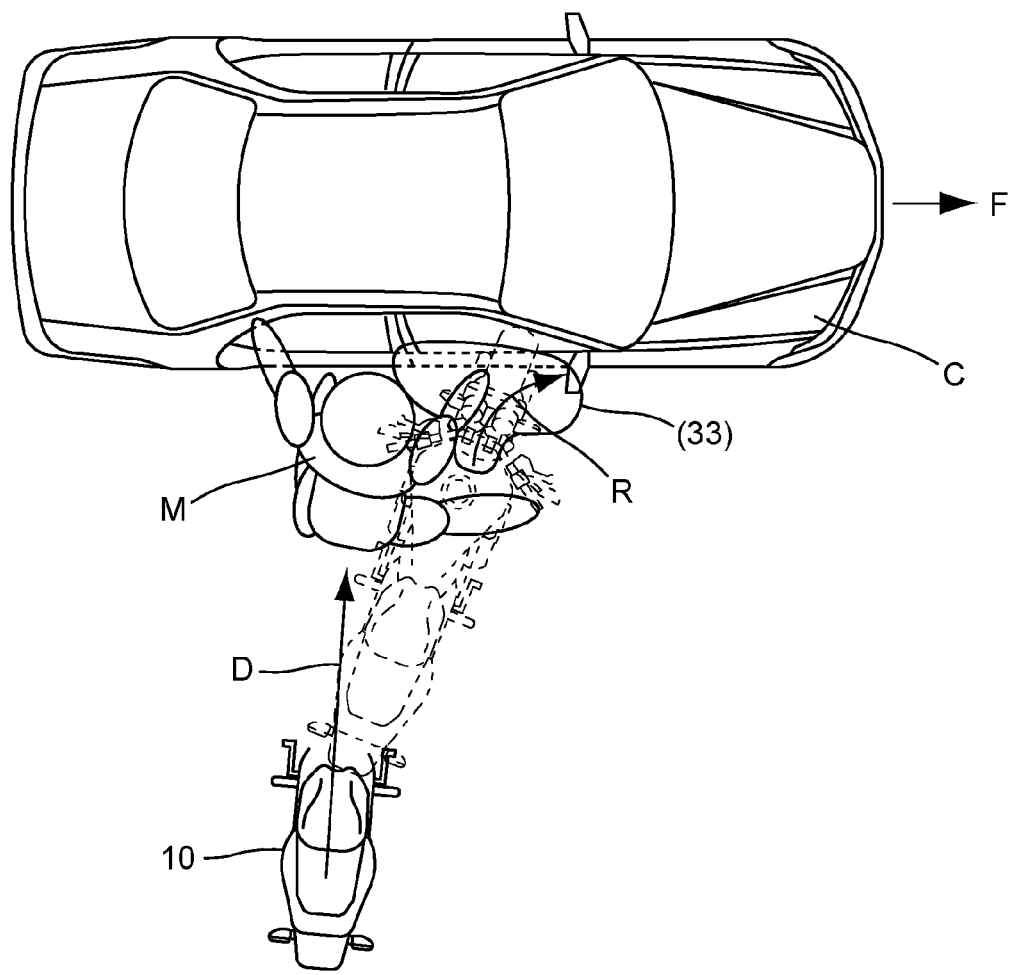
FIG. 9 is a plan showing a state of collision for explaining a problem of the related art.

When the saddle-ride type vehicle 10 collides with the side of the moving vehicle of the other party C as shown in FIG. 7, ordinarily, the front wheel 16F of the saddle-ride type vehicle 10 is turned in a traveling direction F of the vehicle of the other party C as shown in FIG. 9. Accordingly, the steering unit ST is also turned in the same direction (in a direction shown by an arrow R in FIG. 9) (see FIG. 8(a)), and the saddle-ride type vehicle 10 itself is also turned in a state in which the vehicle is turned in the traveling direction of the vehicle of the other party (a state in which yawing is caused and a so-called state in which the vehicle is taken by the vehicle of the other party C). That is, the saddle-ride type vehicle 10 is laterally moved in the traveling direction of the vehicle of the other party C due to collision with the vehicle of the other party C when a traveling direction before the collision is D.

The rider M of the saddle-ride type vehicle 10 can come to collide with the side of the vehicle of the other party C in the traveling direction D before the collision (without being laterally moved), according to a law of inertia.

Accordingly, if no measure is taken, the existing airbag (33) is inflated and deployed in the traveling direction (R) of the saddle-ride type vehicle 10 as shown in FIG. 9.

However, according to the airbag system 20 in this embodiment, as shown in FIG. 8, if the steering unit ST of the saddle-ride type vehicle 10 directs the vehicle 10 clockwise R in the top view immediately after collision, that is, when the airbag 30 is inflated and deployed, the airbag 30 is directed counterclockwise L in a view from the back of the saddle-ride type vehicle 20. The airbag is thus inflated and deployed upward (in the direction shown by the arrow L1) from the vehicle 10 by the operation of the interlocking device 40. The inflated and deployed position is matched with the moving direction D of the rider M, according to the law of inertia (see FIG. 10).

Figure 10:
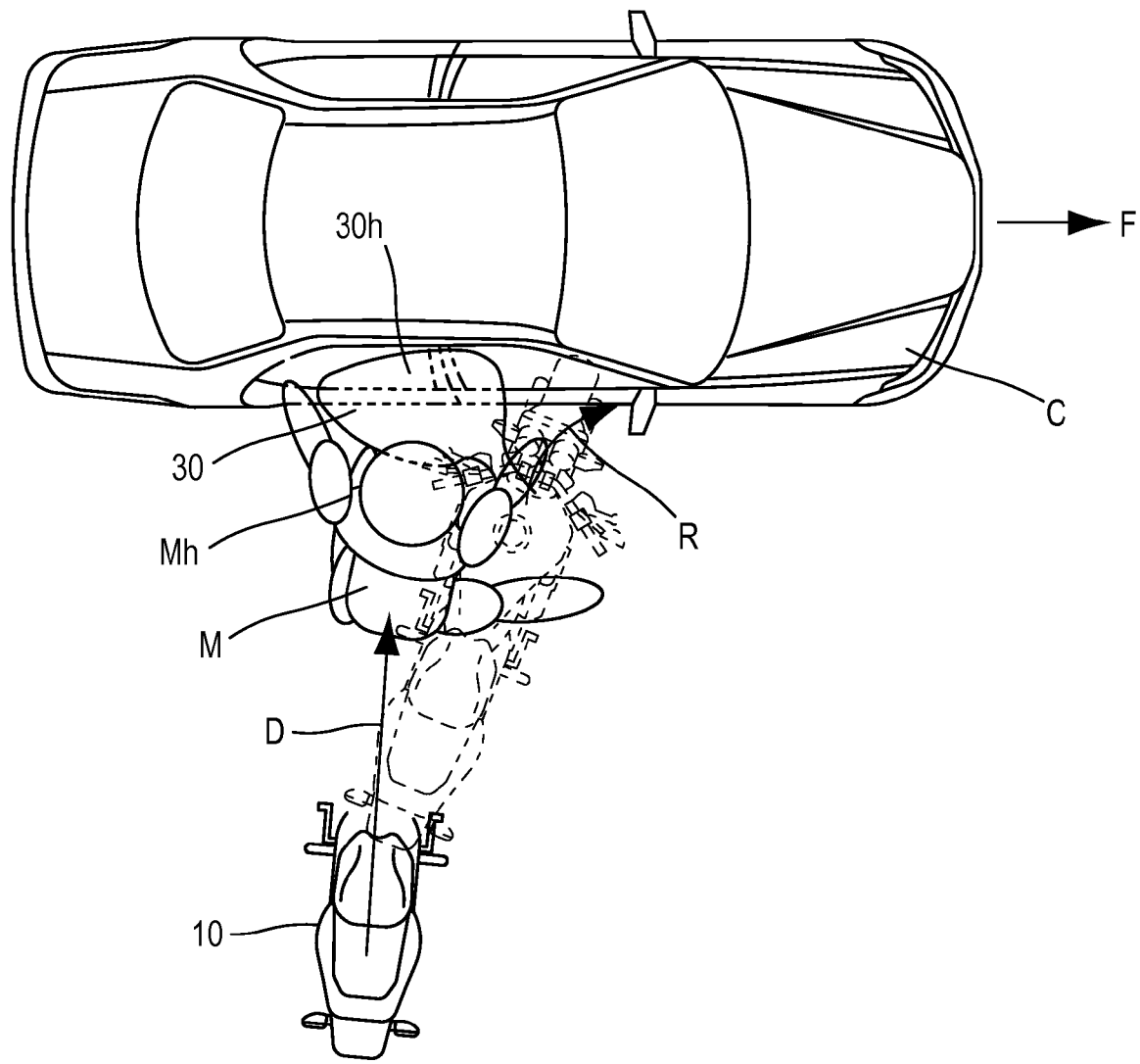
FIG. 10 is a plan showing a state of collision for explaining action by the embodiment.

FIGS. 9 and 10 show a state in which the vehicle of the other party C advances rightward in the top view. However, in collision with the vehicle of the other party C advancing leftward, the steering unit ST is turned leftward L. That is, when the steering unit ST of the saddle-ride type vehicle 10 directs the vehicle 10 counterclockwise L as shown in FIG. 8 in the top view in the inflating and deploying of the airbag 30 immediately after collision, the airbag 30 is directed clockwise R in the view from the back of the saddle-ride type vehicle 10 by the operation of the interlocking device 40 and is inflated and deployed upward (in the direction shown by the arrow R1) from the vehicle 10. The inflated and deployed position is also matched with the moving direction of the rider according to the law of inertia.

Accordingly, according to the airbag system 20 of the saddle-ride type vehicle, even if the saddle-ride type vehicle 10 collides with the side of the running vehicle of the other party C, the airbag 30 can fully fulfill its role.

FIGS. 9 and 10 show a state in which the traveling direction D of the saddle-ride type vehicle 10 is slightly inclined for the traveling direction F of the vehicle of the other party C. However, even if the traveling direction D of the saddle-ride type vehicle 10 is perpendicular to the traveling direction F of the vehicle of the other party C, the similar phenomenon occurs. Besides, when the traveling direction D of the saddle-ride type vehicle 10 is inclined for a collision surface of an object of collision even if the object of collision such as the vehicle of the other party C is stopped, the turning of the steering unit ST also occurs.

Accordingly, in such a case, according to the airbag system 20 of the saddle-ride type vehicle, the airbag 30 can also sufficiently fulfill its role.

Figure 11:
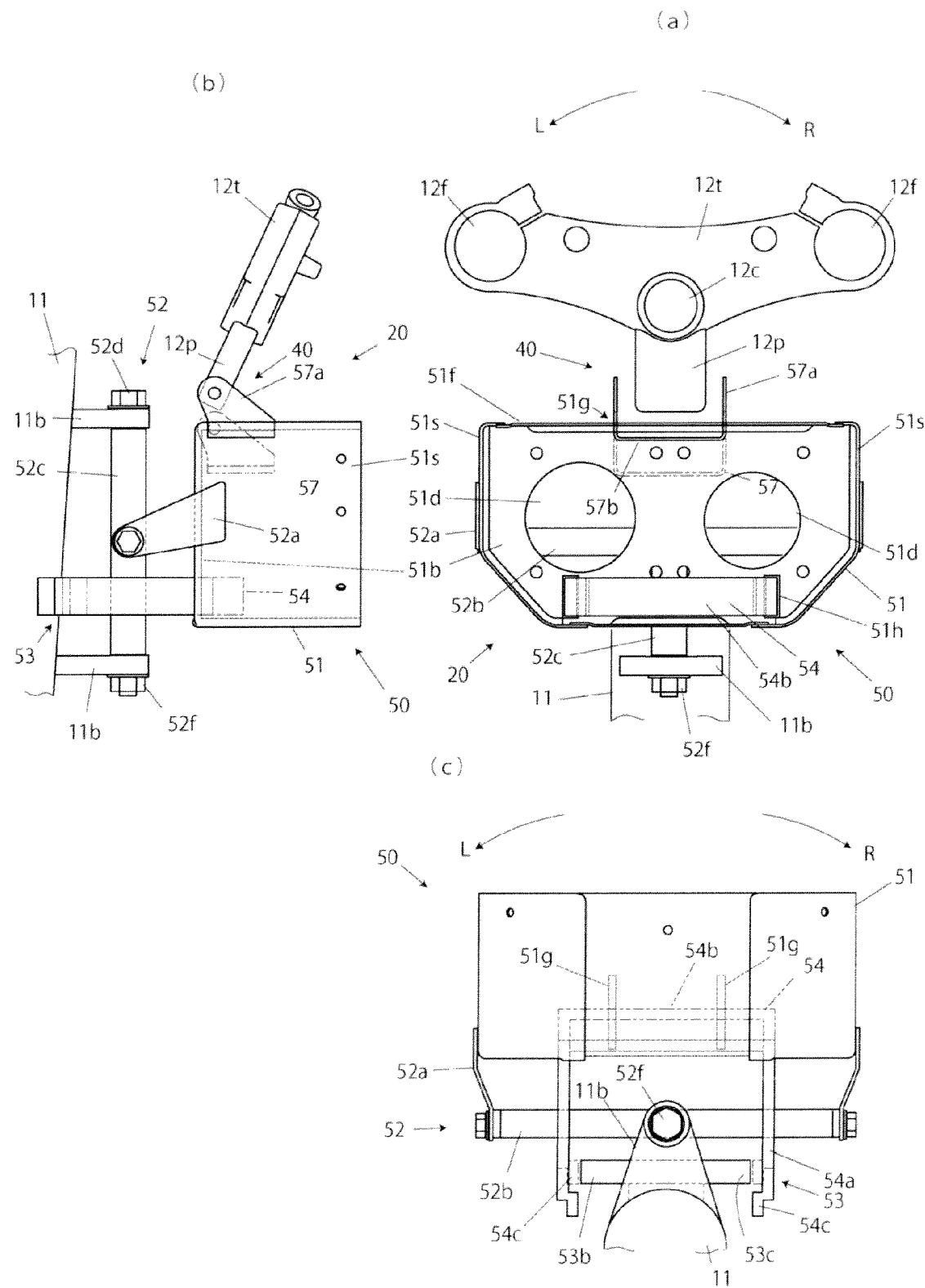
FIGS. 11(a)-11(c) show a main part of the airbag system.
Figure 12:
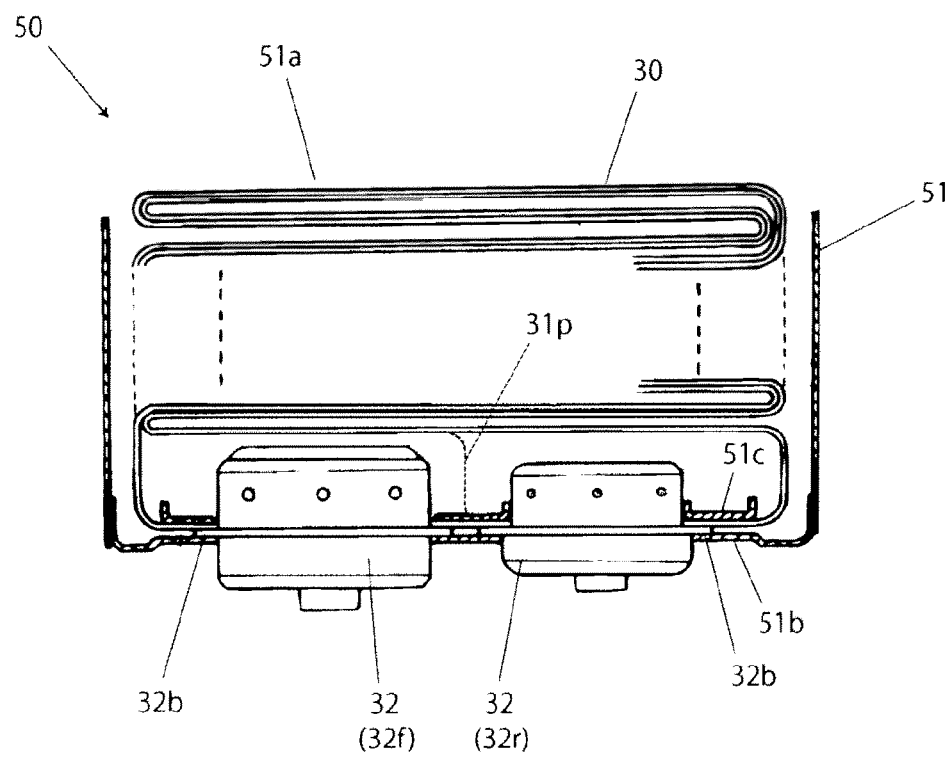
FIG. 12 is a sectional view showing a state in which the airbag 30 and an inflator 32 are housed in a body of a retainer.

FIG. 11 show an example of a main part of the airbag system 20, FIG. 11(a) is a plan, FIG. 11(b) is a side view of FIG. 11(a), and FIG. 11(c) is a front view (viewed from the back of the vehicle) of FIG. 11(a). FIG. 12 is a sectional view showing a state in which the airbag 30 and an inflator 32 are housed in a body of a retainer.

The airbag system 20 is provided with the airbag 30, the retainer 50 that houses the airbag 30 and the interlocking device 40.

The retainer 50 is provided with the box-type body 51 of the retainer, a supporting mechanism 52 that attaches the body 51 of the retainer to the vehicle 10 turnably clockwise R and counterclockwise L in the view from the back of the vehicle 10 as shown in FIG. 11(c), and a locking mechanism 53 that locks the turning of the body 51 of the retainer by the supporting mechanism 52.

The body 51 of the retainer is a case provided with an opening 51a (see FIG. 12) for inflating and deploying the airbag on the upside. An installation hole 51d for attaching the inflator 32 is provided to a bottom plate 51b. As shown in FIG. 12, the inflator 32 can be fixed to the body 51 of the retainer by fixing its flange 32b with a keep plate 51c.

As shown in FIG. 11, the airbag 30 is housed integrally with the inflator 32 in a state in which the airbag is folded in the body 51 of the retainer.

Figure 13:
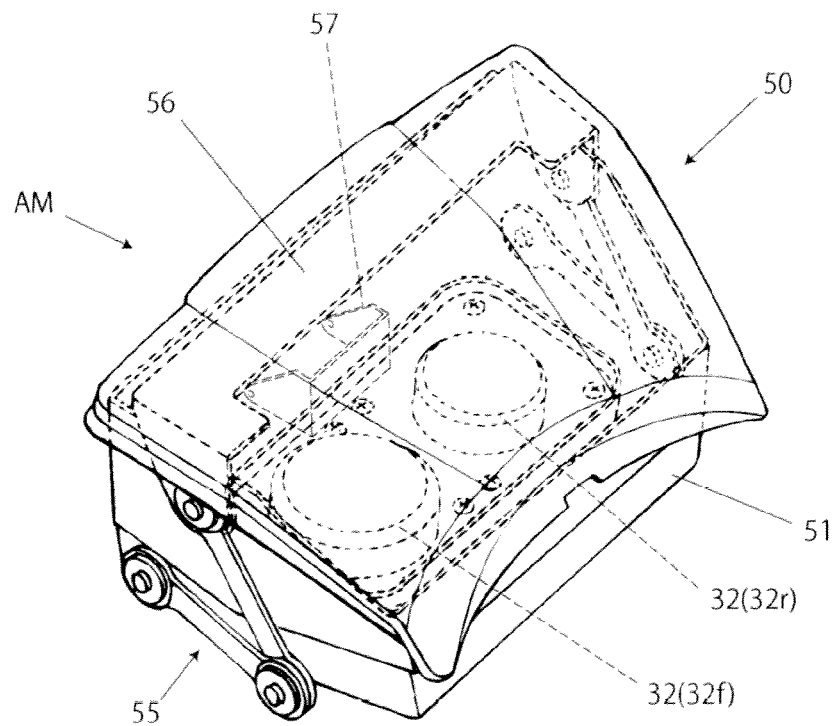
FIG. 13 is a perspective view showing one embodiment of an airbag module.

As shown in FIG. 1, a shock sensor S1 can be installed in the right and left front forks 13 and a control unit CU is mounted in front of the retainer 50. The shock sensor S1 is electrically connected to the control unit CU and the control unit CU is electrically connected to the inflator 32. When collision is caused, the shock sensor S1 transmits detected deceleration data to the control unit CU and the control unit CU instantaneously judges whether the airbag 30 should be operated or not based upon the deceleration data. When the control unit judges that the airbag should be operated, it feeds current for ignition to the inflator 32 so as to operate the inflator 32 and generate gas in the airbag 30 and inflates and deploys the airbag 30. The body 51 of the retainer can be configured as an airbag module AM provided with a lid 56 equipped with a link 55 shown in FIGS. 13 and 14. When the airbag system 20 is not operated, the lid 56 is closed as shown in FIGS. 13 and 14(a). When the airbag 30 is inflated by the operation of the inflator 32, the lid 56 is opened as shown in FIG. 14(b) by the pressure and the airbag 30 is inflated and deployed forward and upward as shown by an arrow A. At that time, as an open angle θ1 of the lid 56 is defined by the extension of the link 55 as shown in FIG. 14(b) and hereby, an inflation/deployment angle of the airbag 30 is defined. The inflated and deployed airbag 30 receives the rider (rider) M and protects the rider M by effectively absorbing the kinetic energy of the rider, exhausting gas from an exhaust hole (see 30vf, 30vr in FIG. 6(b)) and deflating. The contours of the body 51 of the retainer shown in FIG. 11 and the contours of the body 51 of the retainer shown in FIGS. 13 and 14 are different. However, any contour can be adopted.

The inflators 32f, 32r different in output which are shown in FIG. 6 can be arranged in a direction of vehicle width as shown in FIG. 12. In this case, the partition 31p shown by broken lines in FIG. 12 can be arranged in the twisted state at 90 degrees in the body 51 of the retainer for example.

As shown in FIG. 11, the supporting mechanism 52 of the body 51 of the retainer is provided with right and left arms 52a integrally hanging from right and left side boards of the body 51 of the retainer, a rod 52b that couples the right and left arms 52a, a pipe 52c fixed integrally with the rod 52b with the pipe perpendicular to the rod 52b, a pair of brackets 11b provided to the body frame 11, and a bolt 52d and a nut 52f that rotatably support the pipe 52c inside each bracket 11b. The bolt 52d is inserted into the pipe 52c, and the nut 52f is connected to its end. The pipe 52c can be extended in a longitudinal direction of the vehicle 10, can be turned around the bolt 52d, and the body 51 of the retainer, the arms 52a and the rod 52b are turned integrally with the pipe 52c. Accordingly, the body 51 of the retainer can be turned clockwise R and the counterclockwise L in the view from the back of the vehicle 10 in regard to the vehicle 10 as shown in FIG. 11(c).

The locking mechanism 53 is provided to regulate the turning of the body 51 of the retainer by the supporting mechanism 52 when the airbag system 20 is not operated.

The locking mechanism 53 is provided with a regulating body 53b provided on the side of the body of the vehicle and a regulated body 54 provided on the side of the body 51 of the retainer.

The regulating body 53b is configured by a regulating block fixed to the body frame 11 and its both ends 53c configure a regulating part that can be touched to the regulated body 54.

The regulated body 54 is configured by a U-shaped plate member in the view from the back as shown in FIG. 11(c). The regulated body 54 is provided with a pair of arms 54a hanging toward the regulating body 53b and a base 54b that couples upper parts of these arms 54a in the body 51 of the retainer, and the arms 54a are attached to the body 51 of the retainer, protruding downward from the body 51 of the retainer by inserting the arms into a hole 51h bored in the bottom plate 51b of the body 51 of the retainer.

A well-known temporary fastening means (not shown), for preventing the protrusion of the regulated body 54 when the airbag system 20 is not operated, is provided between the body 51 of the retainer and the regulated body 54. The regulated body 54 is thus temporarily held in a position in which an end 54c of the arm 54a of the regulated body 54 is opposite to a regulating part 53c of the regulating body 53b, as shown by an imaginary line in FIG. 11 when the airbag system 20 is not operated. In this state, as the end 54c of the arm 54a of the regulated body 54 is touched to the regulating part 53c of the regulating body 53b even if the body 51 of the retainer tries to turn around the pipe 52c, the turning of the body 51 of the retainer is prevented.

In the meantime, when the airbag system 20 is actuated or operated, the inflator 32 is operated as described above, and the airbag 30 is inflated and deployed upward (more precisely, upward and forward) from the opening 51a of the body 51 of the retainer. However, force in a direction in which the regulated body 54 is protruded from the body 51 of the retainer acts on the regulated body 54 by the rise of pressure in the body 51 of the retainer and the inflating of the airbag 30. The temporary holding of the regulated body 54 by the temporary fastening means is released by this force and the regulated body 54 is protruded as shown by each full line in FIG. 11. A state in which the end 54c of the arm 54a of the regulated body 54 and the regulating part 53c of the regulating body 53b are opposite is released by the protrusion and the body 51 of the retainer can be turned around the pipe 52c.

As shown in FIG. 11, the interlocking device 40 is provided with an operating part 12p provided to the steering unit ST and an engaging part 57 which is provided to the retainer 50, and can be engaged with the operating part 12p.

The operating part 12p is configured as a projecting portion provided to a top bridge 12t forming a part of the steering unit ST. In FIG. 11(a), a reference sign 12f denotes a hole in which the front fork 13 is connected and 12c denotes a hole in which the stem shaft 12s is connected.

The engaging part 57 is configured by an engaging member made of a U-shaped plate in a view from the top as shown in FIG. 11(a). The engaging member 57 is provided with a pair of arms 57a extended toward the operating part 12p. A base 57b couples bases of these arms 57a in the body 51 of the retainer, and is attached to the body 51 of the retainer, protruding forward from the body 51 of the retainer by inserting the arms 57a into each hole 51g provided to a front plate 51f of the body 51 of the retainer.

A well-known temporary fastening means (not shown) for preventing the protrusion of the engaging member 57 when the airbag system 20 is not operated is provided between the body 51 of the retainer and the engaging member 57. The engaging member 57 is thus temporarily held in a position in which the arm 57a of the engaging member 57 is not fitted to the operating part 12p as shown by imaginary lines in FIG. 11 when the airbag system 20 is not operated. In this state, as the arm 57a of the engaging member 57 is not engaged with the operating part 12p even if the steering unit ST is turned and the operating part 12p is turned, the body 51 of the retainer is not turned.

In the meantime, when the airbag system 20 is operated, the inflator 32 is operated as described above and the airbag 30 is inflated and deployed upward from the opening 51a of the body 51 of the retainer, however, force in a direction in which the engaging member is protruded from the body 51 of the retainer acts on the engaging member 57 by the rise of pressure in the body 51 of the retainer and the inflation of the airbag 30 at this time. The temporary holding of the engaging member 57 by the temporary fastening means is released by this force and the engaging member 57 is protruded as shown by full lines in FIG. 11. The arm 54a of the engaging member 57 can be engaged with the operating part 12p by the protrusion and the body 51 of the retainer can be turned around the pipe 52c in interlock with the turning of the steering unit ST.

That is, the interlocking device 40 directs the airbag 30 counterclockwise L as shown in FIG. 8(b) in the view from the back of the vehicle, and inflates and deploys the airbag by turning the retainer (the body 51 in this case) counterclockwise L as shown in FIG. 11(c) in the view from the back of the vehicle, if the steering unit ST directs the vehicle 10 clockwise R as shown in FIG. 8(a) and FIG. 11(a) in the top view when the airbag 30 is inflated and deployed. If the steering unit ST directs the vehicle 10 counterclockwise L as shown in FIGS. 8(a) and 11(a) in the top view when the airbag is inflated and deployed, the interlocking device directs the airbag 30 clockwise R as shown in FIG. 8(b) in the view from the back of the vehicle 10 by turning the body 51 of the retainer clockwise R as shown in FIG. 11(c) in the view from the back of the vehicle and inflates and deploys the airbag.

According to the above-mentioned interlocking device 40, a position in which the airbag 30 is inflated and deployed can be securely matched with the moving direction D of the rider M (see FIG. 10).

As the interlocking device 40 is configured by the operating part 12p provided to the steering unit ST, and the engaging part 57 provided to the retainer 50 and engaged with the operating part 12p, the position in which the airbag 30 is inflated and deployed can be matched with the moving direction D of the rider M, with a simple configuration.

Further, as the engaging part 57 has configuration that the engaging part is protruded toward the operating part 12p only when the airbag 30 is inflated and deployed and can be engaged with the operating part 12p, the steering unit ST and the retainer 50 of the airbag 30 are interlocked only in the case of need. Accordingly, an unnecessary motion of the retainer 50 can be prevented.

Furthermore, as the engaging part 57 has configuration that the engaging part is protruded toward the operating part 12p by internal pressure in the body 51 of the retainer raised when the airbag 30 is inflated and deployed, the engaging part 57 can be protruded utilizing the inflation and deployment of the airbag 30 as it is. Accordingly, means for protruding the engaging part 57 is not required to be separately prepared, and the increase of the number of parts can be inhibited.

Furthermore, as the operating part 12p is configured as the projecting portion provided to the top bridge 12t forming a part of the steering unit ST, the projecting portion has only to be provided to the top bridge 12t and intricate working for the operating part is not required.

As shown in FIGS. 4 and 5, the airbag 30 in this embodiment is provided with a head part 30h disposed opposite to the head Mh of the rider M during inflation and deployment, and a neck part 30n which rises upward from the vehicle 10 and toward the head part 30h. Width W1 in a direction of vehicle width is narrower than the width W2 of the head part 30h. An airbag 30 has neckings 30c curved inside in the direction of vehicle width.

As a result, the neck part 30n and the head part 30h of the airbag 30 are inflated and deployed as shown in FIG. 5 during inflation and deployment with the neck part 30n having the neckings 30c avoiding so-called interference from the vehicle 10. Therefore, even if the saddle-ride type vehicle 10 collides with the side of the running vehicle of the other party C, and is turned in the traveling direction of the vehicle of the other party C as shown in FIG. 10, the airbag 30 is inflated and deployed in the substantially same direction as the traveling direction D before the collision, and the state is easily maintained. That is, the airbag 30 is inflated and deployed immediately after the collision, ordinarily, the saddle-ride type vehicle 10 is turned in the same direction as the vehicle of the other party C immediately after it, and the rider M comes to collide with the side of the vehicle of the other party C in the traveling direction D before the collision. However, at that time, the neck part 30n having the neckings 30c can avoid interference from the vehicle 10 by the quantity of the neckings 30c. Even if the saddle-ride type vehicle 10 is laterally moved in FIG. 5 for example, the vehicle body (the handlebar 14 in FIG. 5) is hardly touched to the neck part 30n owing to the existence of the neckings 30c. As a result, the airbag 30 is not significantly moved together with the vehicle 10.

Therefore, a position of the part opposite to the head 30h in the inflated and deployed airbag 30 is more securely matched with the moving direction D of the rider M according to the law of inertia, as shown in FIG. 10, combined with the operation of the interlocking device 40.

According to an embodiment of the airbag system 20 of the saddle-ride type vehicle 10, even if the vehicle collides with the side of the running vehicle of the other party C, the airbag 30 can fully fulfill its role.

As shown in FIGS. 4 and 5, the airbag 30 and the handlebar 14 are configured so that the head part 30h is located on the upside of the handlebar 14 provided to the vehicle during inflation and deployment because the neck part 30n rises.

As a result, the airbag 30 can more securely avoid interference from the vehicle, particularly from the handlebar 14, and is not significantly moved together with the vehicle 10. Therefore, the position of the part opposite to the head 30h is more easily matched with the moving direction D of the rider M.

As shown in FIG. 5, an upper part 30h2 of the head part 30h is made wider in the direction of vehicle width during inflation and deployment than a lower part 30h1. The airbag 30, including the neck part 30n, is fan-shaped.

As a result, the airbag 30 can more securely avoid interference from the vehicle 10 and is not significantly moved together with the vehicle 10. Therefore, the position of head part 30h is more easily matched with the moving direction D of the rider M. As the lower part 30h1 head part 30h is made narrower than the upper part 30h2, the compactness of the airbag 30 is promoted in addition to compactness by the making of the neckings 30c. And a rider protecting function can be enhanced by relatively making the upper part 30h2 of the part opposite to the head 30h wider.

As shown in FIG. 4, the head part 30h is located in front of the handlebar 14 provided to the vehicle during inflation and deployment.

As a result, the airbag 30 can more securely avoid interference from the vehicle, particularly from the handlebar 14, and is not significantly moved together with the vehicle. Therefore, the position of head part 30h is more easily matched with the moving direction of the rider.

Figure 15B:
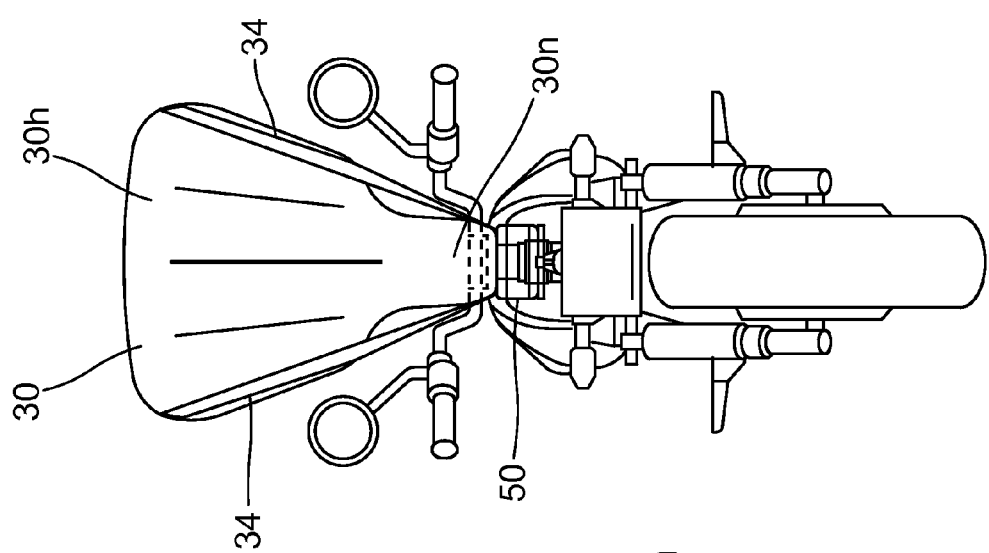
FIGS. 15(a)-15(b) show one embodiment of a saddle-ride type vehicle using another embodiment.
Figure 15A:
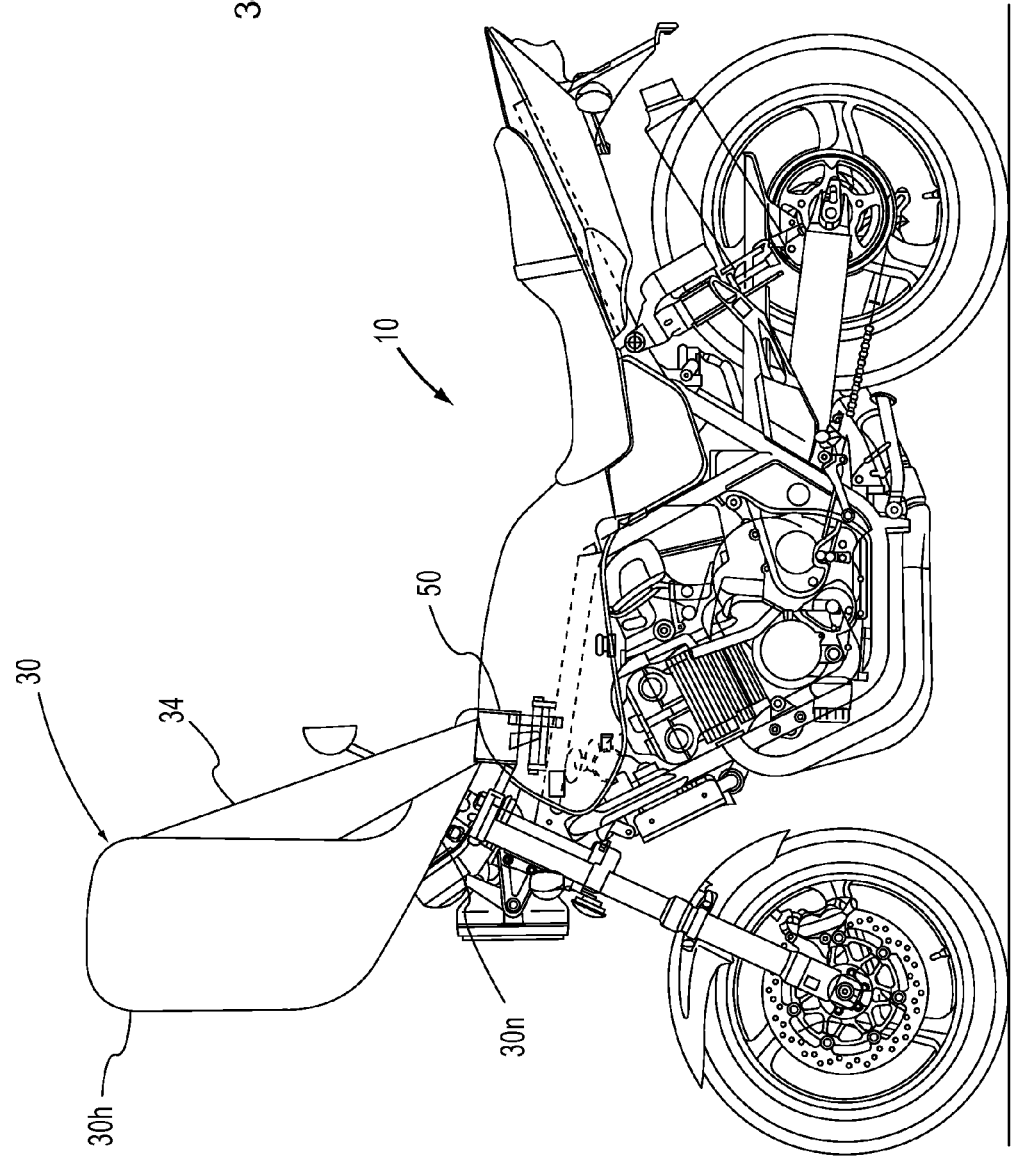

FIG. 15 show one embodiment of a saddle-ride type vehicle using another embodiment, FIG. 15(a) is a side view, and FIG. 15(b) shows the vehicle viewed from the back.

This embodiment is different from the above-mentioned embodiment in that a pair of right and left mooring bodies 34, that couple head part 30h and the vehicle 10 separately from a neck part 30n and moor the part opposite to the head 30h during inflation and deployment are provided and are similar at the other points.

As a result, even if no material body for supporting an airbag 30 (for example, no surface of a vehicle of the other party C) exists immediately in front of the airbag 30, inflated and deployed as shown in FIG. 16(a) for example, the airbag 30 can receive rider M and can absorb a part of rider's kinetic energy. If the mooring body 34 is not provided, the airbag 30 cannot reliably receive the rider M when no material body for supporting the airbag 30 (for example, no surface of the vehicle of the other party C) exists immediately in front of the airbag 30, for example as inflated and deployed as shown in FIG. 16(b).

Airbag 30 can receive the rider M as shown in FIG. 16(a), for example by providing the mooring body 34 and can absorb a part of rider's kinetic energy.

The mooring body 34, in this example, is coupled to the above-mentioned airbag module AM on the side of the vehicle. For example, the mooring body can be directly fixed to an inner face of a side board 51s of the body 51 of the retainer shown in FIG. 11 for example. The mooring body 34 can be housed together with the airbag 30 with the mooring body folded in the body 51 of the retainer.

When the mooring body 34 is coupled not to a body of the vehicle 10 (for example, a body frame 11), but instead to the airbag module AM, a degree of freedom in the design of the other body parts, for example, the body frame 11, can be enhanced compared with a case that the mooring body 34 is coupled to the body of the vehicle 10.

The pair of right and left mooring bodies 34 are coupled to both right and left ends of the part opposite to the head 30h in a direction of vehicle width on the side of the airbag 30.

As a result, even if no material body for supporting the airbag 30 (for example, no surface of the vehicle of the other party C) exists immediately in front of the airbag 30 inflated and deployed, the airbag 30 receives the rider M and can absorb a part of rider's kinetic energy.

Figure 17B:
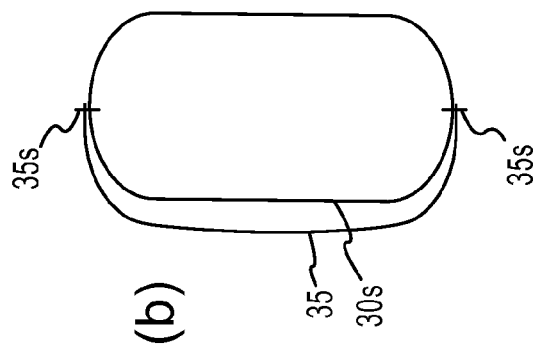
FIG. 17(a) is a side view showing one embodiment of a saddle-ride type vehicle using further another embodiment and FIG. 17(b) is a sectional view viewed along a line b-b shown in FIG. 17A.
Figure 17A:
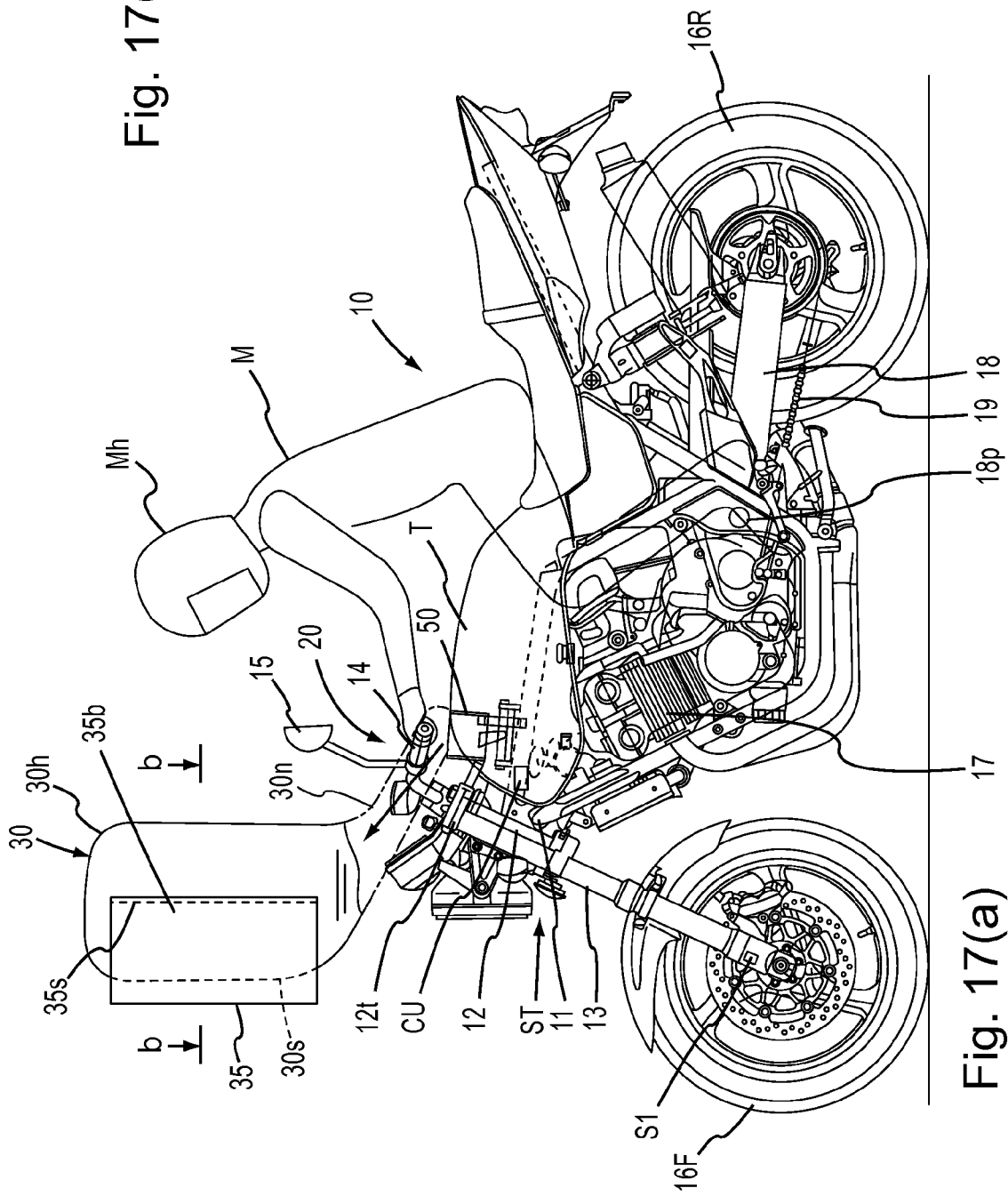

FIG. 17(a) is a side view showing one embodiment of a saddle-ride type vehicle using another embodiment; FIG. 17(b) is a sectional view viewed along a line b-b in FIG. 17(a).

This embodiment is different from the above-mentioned embodiments in that a protective sheet 35 for protecting a surface 30s is provided to an airbag 30 with the protective sheet loosened, compared with the surface 30s of the airbag 30.

As a result, as the protective sheet 35 for protecting the surface 30s of the airbag 30 is provided with the protective sheet loosened, compared with the surface 30s of the airbag 30, no tension is caused on the protective sheet 35 when the airbag 30 is inflated and deployed or even if tension is caused, it is a small amount.

Accordingly, even if a sharp body hits on the protective sheet 35, the protective sheet 35 is not significantly damaged. When the sharp body (not shown) hits on the airbag 30, it hits via the protective sheet 35 and as the protective sheet 35 is not significantly damaged, external force applied to the airbag 30 by the sharp body acts on the airbag with the external force buffered by the protective sheet 35. Accordingly, the airbag 30 is also not significantly damaged.

Even if the airbag 30 is pressed on the side and others of a vehicle of the other party C in collision with the vehicle of the other party C as shown in FIG. 7, the airbag 30 is not significantly damaged and a function of the airbag for protecting rider M is secured.

As clear from the above-mentioned description, according to this embodiment, the airbag can be effectively protected without using a very strong sheet, compared with a case that the protective sheet is closely provided to the surface of the airbag 30.

According to this embodiment, since the airbag can be protected without requiring a thick sheet and a firm stitch, a compact airbag system suitable for the saddle-ride type vehicle 10 can be provided.

If the protective sheet 35 is a sheet having strength at which the above-mentioned protecting function can be fulfilled, a sheet made of arbitrary material can be adopted. For example, well-known foundation cloth forming the airbag 30 can be used for the protective sheet 35. However, if the protective sheet 35 having higher resistance to cutting or tearing is used, the airbag system can be lightened and miniaturized.

For providing the protective sheet 35 to the surface 30s of the airbag 30, the protective sheet 35 can be provided with the protective sheet loosened and suitable fastening or attaching means can be adopted.

For example, as shown in FIG. 17, both sides 35b of the protective sheet 35 can be joined to the airbag 30 (a joined part is shown by a reference sign 35s).

As shown in FIGS. 18(a) and 18(b), an upper edge 35c and a lower edge 35d of the protective sheet 35 can be joined to the airbag 30.

As shown in FIGS. 18(c) and 18(d), the periphery of the protective sheet 35 can be also connected to the airbag 30 at spots (at four corners in a case shown in FIGS. 18(c) and 18(d)) of the periphery of the protective sheet 35. A connected part is shown by a reference sign 35m. The connected part 35m can be also connected by joining and can be also connected by welding and adhesion.

When the periphery of the protective sheet 35 is connected to the airbag 30 at the spots as described above, the bulk of the connected part can be reduced and housing size can be minimized.

Welding and adhesion can be used in place of joining 35s.

Even if the above-mentioned connecting or fastening means is used, the protective sheet 35 is provided to the surface 30s of the airbag 30 with the protective sheet loosened by connecting the airbag 30 and the protective sheet 35 in connected parts so that the protective sheet 35 connected to the airbag in the connected parts is longer than the airbag, compared with the distance of the surface 30s of the airbag.

The protective sheet 35 can prevent the airbag 30 from being torn, minimizing the housing size of the airbag 30 and the protective sheet 35 by providing the protective sheet only on the front side of the airbag 30 in swelling as shown in FIG. 17.

The embodiments of the present invention have been described, however, the present invention is not limited to the above-mentioned embodiments and can be suitably embodied in a range of the essential points of the present invention. The above-mentioned embodiments may be also combined.

REFERENCE SIGNS LIST

10 Saddle-ride type vehicle
20 Airbag system
30 Air bag

30vf, 30vr Vent hole
31f, 31r Expansion chamber
32 Inflator

We claim:

1. An airbag system, said system comprising:
   an airbag configured to be inflated and deployed in front of a rider of a saddle-ride type vehicle; and
   an interlocking device configured to determine a direction for the inflating and deploying the airbag,
   wherein the direction comprises a direction corresponding to an inertial direction of the saddle-ride type vehicle,
   wherein the airbag comprises a plurality of expansion chambers, said plurality of expansion chambers configured to be different in internal pressure during inflation and deployment in a longitudinal direction of the vehicle,
   wherein said airbag system is configured on the saddle-ride type vehicle, and
   wherein the airbag is mounted in front of a fuel tank of the saddle-ride type vehicle.

2. The airbag system according to claim 1, wherein an internal pressure of a rearmost expansion chamber is reduced, compared with the internal pressure of a front expansion chamber.

3. The airbag system according to claim 1, further comprising:
   an inflator for each expansion chamber, wherein each inflator is different in output for each of the plurality of expansion chambers,
   wherein the plurality of expansion chambers is configured to be inflated and deployed by each inflator.

4. The airbag system according to claim 1, wherein a vent hole is provided to each of the plurality of expansion chambers, each vent hole having a different size than other vent holes, so as to differentiate the internal pressure during inflation and deployment.

5. The airbag system according to claim 1,
   wherein a volume of the plurality of expansion chambers is differentiated, and wherein each expansion chamber is provided with a corresponding inflator.

6. The airbag system according to claim 5, wherein each inflator for each of the plurality of an expansion chamber has a same output.

7. An airbag system, comprising:
   airbag means for inflation and deployment in event of a collision;
   detection means for detecting a collision, said detection means initiating inflation and deployment of the airbag when a collision is detected; and
   interlocking means for determining a direction for the inflating and deploying the airbag,
   wherein the direction comprises a direction corresponding to an inertial direction of a saddle-ride type vehicle,
   wherein said airbag means further comprises a plurality of expansion chamber means, each of said plurality of expansion chamber means initiates inflation and deployment at a different internal pressure than another of the plurality of expansion chamber means, and
   wherein said airbag system is configured on the saddle-ride type vehicle, and
   wherein the airbag is mounted in front of a fuel tank of the saddle-ride type vehicle.

8. The airbag system according to claim 7, wherein an internal pressure of a rearmost expansion chamber means is less than an internal pressure of a front expansion chamber means.

9. The airbag system according to claim 7, further comprising:
   inflation means for each of said plurality of expansion chamber means, said inflation means for inflating and deploying the airbag means in the event of a collision.

10. The airbag system according to claim 7, wherein each expansion chamber means of the plurality of expansion chamber means includes a vent hole, wherein each vent hole has a different size than other vent holes, so as to differentiate the internal pressures among the expansion chamber means during inflation and deployment.

11. The airbag system according to claim 7, wherein each expansion chamber means of the plurality of expansion chamber means has a different volume than other of the expansion chamber means, and wherein each expansion chamber means is provided with a corresponding inflation means for inflating the corresponding expansion chamber means.

12. The airbag system according to claim 11, wherein each inflation means for each of the expansion chamber means has a same output.

13. The airbag system according to claim 1, wherein the airbag is configured to be moored to the vehicle by at least one mooring body, wherein the mooring body is configured to permit the airbag to absorb a part of a rider's kinetic energy by exerting an opposite force on the airbag.

14. The airbag system according to claim 7, wherein the airbag is configured to be moored to the vehicle by at least one mooring body, wherein the mooring body is configured to permit the airbag to absorb a part of a rider's kinetic energy by exerting an opposite force on the airbag.

* * * * *